United States Patent
Burford et al.

(10) Patent No.: US 9,942,577 B1
(45) Date of Patent: Apr. 10, 2018

(54) DYNAMIC OBJECTS CACHING FOR MEDIA CONTENT PLAYBACK

(71) Applicant: Amazon Technologies, Inc., Seattle, WA (US)

(72) Inventors: Kenneth Thomas Burford, Seattle, WA (US); Nicholas James Benson, Seattle, WA (US); Justin Michael Binns, Auburn, WA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 15/051,240

(22) Filed: Feb. 23, 2016

(51) Int. Cl.
| | | |
|---|---|---|
| H04N 7/173 | (2011.01) | |
| H04N 21/2183 | (2011.01) | |
| H04N 21/6543 | (2011.01) | |
| H04N 21/258 | (2011.01) | |
| H04N 21/647 | (2011.01) | |
| H04N 21/845 | (2011.01) | |
| G11B 27/10 | (2006.01) | |
| H04N 21/231 | (2011.01) | |
| H04N 21/633 | (2011.01) | |

(52) U.S. Cl.
CPC ......... *H04N 21/2183* (2013.01); *G11B 27/10* (2013.01); *H04N 21/23106* (2013.01); *H04N 21/25808* (2013.01); *H04N 21/633* (2013.01); *H04N 21/647* (2013.01); *H04N 21/6543* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 8,234,350 | B1 * | 7/2012 | Gu | H04N 21/234309 709/203 |
| 8,561,102 | B1 * | 10/2013 | MacK | H04N 21/25841 725/109 |
| 8,677,428 | B2 * | 3/2014 | Lewis | H04N 21/44016 725/36 |
| 9,613,042 | B1 * | 4/2017 | Joseph | G06F 17/30115 |
| 2011/0296048 | A1 * | 12/2011 | Knox | H04L 65/605 709/231 |
| 2012/0047542 | A1 * | 2/2012 | Lewis | H04N 21/44016 725/97 |
| 2012/0054876 | A1 * | 3/2012 | Johansson | H04N 21/8455 726/28 |
| 2013/0067052 | A1 * | 3/2013 | Reynolds | H04L 67/02 709/223 |
| 2013/0159455 | A1 * | 6/2013 | Braskich | H04L 67/303 709/217 |
| 2014/0089465 | A1 * | 3/2014 | van Brandenburg | H04L 65/605 709/217 |

(Continued)

*Primary Examiner* — James R Sheleheda
(74) *Attorney, Agent, or Firm* — Weaver Austin Villeneuve & Sampson LLP

(57) ABSTRACT

Techniques are described for caching dynamic objects for media content playback. A media server can provide a cache key representing a set of instructions used to select a subset of manifest data. The cache key can be provided to a viewer device, which can then contact a content delivery network (CDN) for a dynamic manifest file corresponding to the cache key. The CDN can contact the media server to have the dynamic manifest file generated using the cache key if it is not in its cache.

20 Claims, 12 Drawing Sheets

(56) References Cited

U.S. PATENT DOCUMENTS

| | | | | |
|---|---|---|---|---|
| 2014/0101118 A1* | 4/2014 | Dhanapal | H04N 21/251 | 707/695 |
| 2014/0189044 A1* | 7/2014 | Cox | H04L 67/2852 | 709/216 |
| 2014/0280688 A1* | 9/2014 | Mao | H04L 67/2847 | 709/214 |
| 2014/0280906 A1* | 9/2014 | Johns | H04L 45/28 | 709/224 |
| 2015/0019968 A1* | 1/2015 | Roberts | G11B 27/28 | 715/719 |
| 2015/0046714 A1* | 2/2015 | Knox | H04L 9/0833 | 713/171 |
| 2015/0074232 A1* | 3/2015 | Phillips | H04L 65/604 | 709/219 |
| 2015/0127845 A1* | 5/2015 | Phillips | H04L 65/601 | 709/231 |
| 2015/0249854 A1* | 9/2015 | Knox | H04L 12/2805 | 725/92 |
| 2015/0269629 A1* | 9/2015 | Lo | G06Q 30/0269 | 705/14.66 |
| 2015/0334153 A1* | 11/2015 | Koster | H04L 65/4069 | 709/219 |
| 2016/0014439 A1* | 1/2016 | Friedrich | H04N 21/23439 | 725/92 |
| 2016/0182466 A1* | 6/2016 | Wagenaar | H04L 63/0457 | 713/154 |
| 2016/0191664 A1* | 6/2016 | Balakrishnan | H04L 67/26 | 709/203 |
| 2016/0234549 A1* | 8/2016 | Ducloux | H04N 21/23439 | |
| 2016/0366202 A1* | 12/2016 | Phillips | H04L 43/08 | |
| 2016/0373547 A1* | 12/2016 | Phillips | H04L 47/26 | |
| 2017/0063552 A1* | 3/2017 | Abt, Jr. | H04L 9/3247 | |
| 2017/0078350 A1* | 3/2017 | Gordon | H04N 21/23439 | |

* cited by examiner

DYNAMIC OBJECTS CACHING FOR MEDIA CONTENT PLAYBACK

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content is often streamed over networks using adaptive bitrate streaming for playback on a viewer's device. Adaptive bitrate streaming includes determining the viewer device's bandwidth and hardware resources in real time and adjusting the quality of the media content that is requested from a media server and played back on the viewer's device to account for changes in the bandwidth and hardware resources. Fragments at different quality levels, or bitrates, of the media content detailed in a manifest file are requested individually and stored in a buffer for playback.

Static objects, such as the fragments, are often stored within a cache of an edge server of a content delivery network (CDN) to provide fast and reliable playback. Dynamic objects, such as some manifest files, can vary in content. Unfortunately, dynamic objects are difficult to cache at an edge server of a CDN.

DETAILED DESCRIPTION

Figure 1:
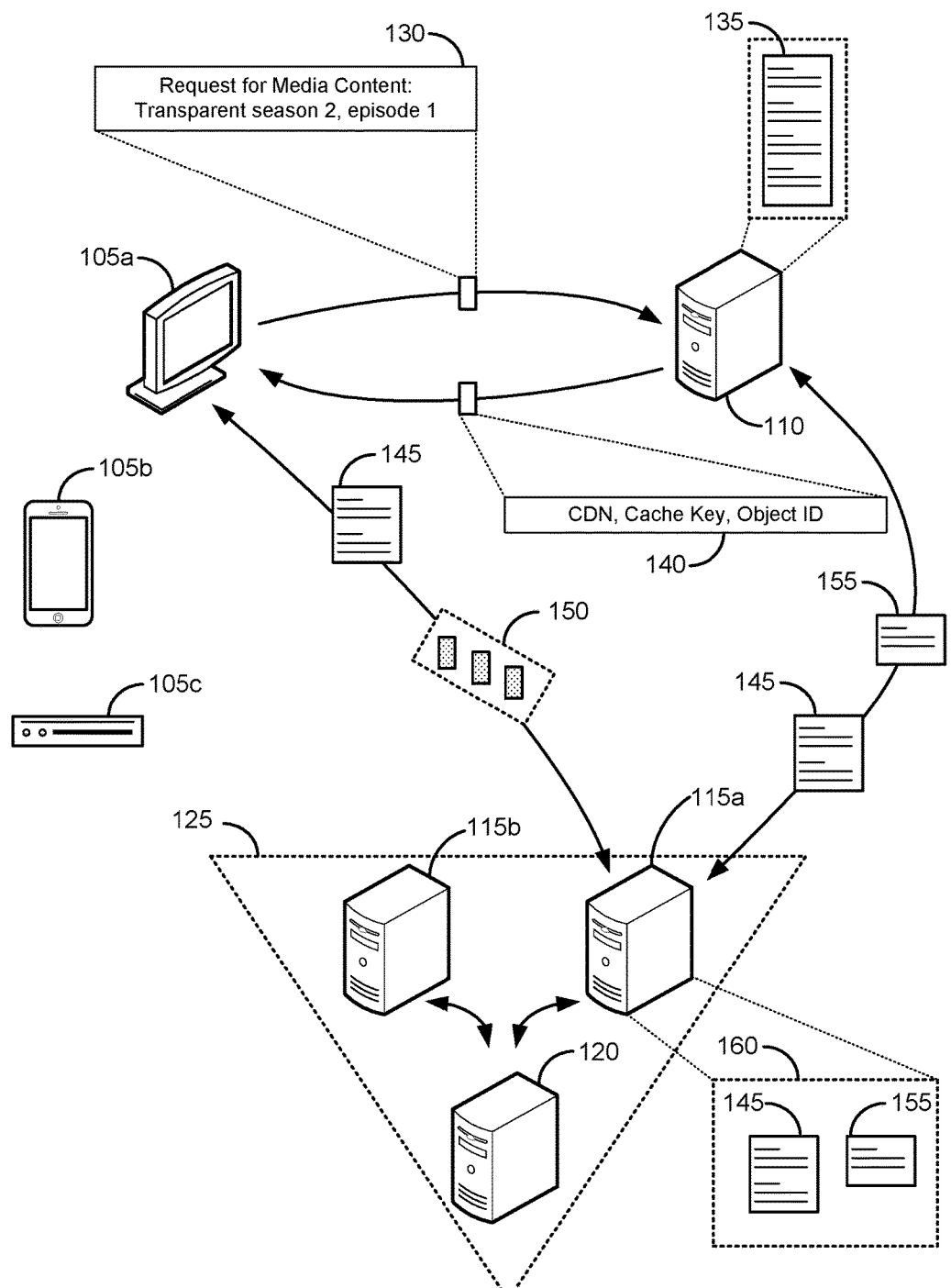
FIG. 1 illustrates an example of caching dynamic objects for media content playback.

This disclosure describes techniques for implementing caching of dynamic objects at an edge server of a content delivery network (CDN). As an example, when a viewer requests media content (e.g., a movie, a television show, a video, etc.) to stream for playback on a device, the bandwidth of the Internet connection available to the viewer's device and the availability of the hardware resources of the viewer's device can be used by a heuristic algorithm (implemented by the viewer's device) to determine a video quality level, or bit rate, of the media content to be requested for the playback. The viewer's device requests the fragments using a manifest file that details the fragments, or segments of time, of the playback of the media content available at the different quality levels.

A dynamic manifest file can include a subset of the available playback data for the media content such that different viewer devices can be provided manifest files indicating different playback options for the same media content. For example, one manifest file might detail playback options for 720p and 1080p video quality levels, but another manifest file might detail playback options for the same media content at the ultra-high-definition (UHD), 1080p, 720p, and 576i video quality levels. Other types of data that can be detailed in manifest files include audio quality levels, subtitles, etc. The selection of playback data to include in the dynamic manifest files can be based on a variety of attributes of the viewer and/or viewer device such as characteristics of the viewer device (e.g., location, type of device, operating system, etc.), playback history, the request itself for the manifest file (e.g., timing), user account profile, and other factors.

Each attribute can correspond to an instruction to select some portion of the available playback data to be provided in a dynamic manifest file. The different subsets of selections of playback data can be relatively small compared to the number of attributes considered. For example, if geographic location of the viewer device, time of the playback, internet service provider (ISP) being used by the viewer device, type of viewer device, etc. are considered, then upwards of tens of thousands of instructions to select playback data based on those attributes with each representing some manipulation of the available playback data can exist. However, the tens of thousands of instructions might only result in a dozen or so different subsets of playback options (corresponding to the available playback data).

For example, a viewer device located in New York City might result in an instruction in which UHD, 1080p, 720p, and 576i quality levels are selected as playback options from available playback options that include UHD, 1080p, 720p, 576i, and 480p. Next, if the viewer device is a smartphone, then only 720p and 576i are selected. Eventually, the available playback data is pared down to a smaller subset based on the attributes and their corresponding instructions. A different combination of attributes might result in the same subset or a different subset depending on the instructions for the attributes. For example, a viewer device located in Seattle might result in an instruction in which UHD, 1080p, and 720p quality levels are selected, excluding the 576i quality level that would be selected if the viewer device was located in New York City. If the viewer device is also a smartphone, then only the 720p quality level would be selected rather than both 720p and 576i quality levels. As a result, a smartphone in Seattle would be provided a dynamic manifest file providing playback options at the 720p video quality level. A smartphone in New York City would be provided a dynamic manifest file providing playback options for the same media content at both the 720p and 576i quality levels. However, a video game console in Burlington, Vt. might result in similar instructions as the smartphone in New York City despite having different attributes, and therefore, would be provided a dynamic manifest file similar to the smartphone in New York City providing playback options for the same media content at the 720p and 576i video quality levels.

Caching dynamic objects such as manifest files at an edge server of a CDN can be difficult since many different combinations of attributes are considered. Static files, such as the individual fragments being requested, are seldom changed objects which are easily identified and cached at edge servers of CDNs. Caching objects at an edge server provides a source for the objects that is relatively close to the viewer device, resulting in an increase in reliability and performance that can improve the quality of the playback of the media content for a viewer.

To enable caching of dynamic objects, a cache key can be used to represent the series of instructions (based on the attributes) to select the subset of the available playback data. For example, a viewer device can contact a media server indicating that it wishes to start playback of media content, such as a movie. The media server can receive that request and provide a dynamic object identifier representing master manifest data including all of the available playback data from which the subsets are generated from, an edge server of a CDN to contact, and a cache key representing the pared down subset of the available playback data within the master manifest data. The viewer device can then contact the edge server and provide the dynamic object identifier and cache key. The edge server can look up whether it has a dynamic manifest in its cache that provides the subset of data by using the dynamic object identifier and cache key. If the edge server has a dynamic manifest file in its cache that corresponds to that subset of data, then it can provide it to the viewer device so that playback can quickly begin. However, if the edge server does not have the dynamic manifest file in its cache, then it can contact the media server to receive it. Using the cache key and object identifier, the media server can generate the dynamic manifest file and then provide the dynamic manifest file to the viewer device to start playback. The dynamic manifest can also be cached by the edge server so that it can be quickly provided to another viewer device in the future.

In more detail, FIG. 1 illustrates an example of caching dynamic objects for media content playback. As shown in FIG. 1, viewer device 105a requests playback of media content (indicated as episode 1 of the second season of the show Transparent) via request 130 provided to media server 110. Media server 110 stores master manifest data 135, which includes all of the available playback data indicating all of the playback options of the media content (e.g., fragments at different video and audio quality levels, subtitles, etc.) for generating a dynamic manifest file to provide playback at viewer device 105a of episode 1 of the second season of Transparent. In some implementations, master manifest data 135 is a static object that can be used to create a dynamic object such as a dynamic manifest file.

Based on the attributes related to request 130, media server 110 can determine the set of instructions to be applied and the resulting subset of master manifest data 135 that should be used to provide a dynamic manifest file. Such attributes may represent characteristics of the viewer device including, for example, its geographic location, its device type, its hardware (e.g., screen size), time of the request, ISP providing the communications connection from viewer device 105a to media server 110, playback history, etc. That is, the set of instructions can allow for the computation or generation of a dynamic manifest file from master manifest data 135. The sets of instructions can correspond to a cache key. For example, a hash table (or map) data structure can be used in which the hash is the cache key that is linked to the values (or buckets) that represent the instructions. Since relatively few variations of subsets of master manifest data 135 exist (resulting in a few cache keys), many different combinations of attributes can lead to similar combinations of instructions that are mapped to a single cache key representing the final subset of the playback data based on those instructions.

Media server 110 can provide manifest retrieval data 140 indicating an edge server of a CDN to contact for retrieving a dynamic manifest file providing playback options indicated in the subset of master manifest data 135. For example, dynamic manifest retrieval data 140 can provide a URL for the edge server of the CDN and embed a query string with parameters providing the cache key and an object identifier. In other implementations, dynamic manifest retrieval data can be provided in other ways, for example, by providing a file including the data, passing the data via an API, etc. As previously discussed, the cache key represents a set of instructions resulting in a subset of master manifest data 135. The object identifier (or master manifest data identifier) indicates that the cache key represents a dynamic manifest file that is based off of master manifest data 135.

Viewer device 105a can then request a dynamic manifest file from edge server 115a of CDN 125 to begin playback of the media content. In FIG. 1, edge server 115a is an edge server identified as being a candidate to provide fragments and manifest files for playback because it might be closer than edge server 115b of CDN 125. Origin server 120 represents another level of hierarchy of CDN 125 from which edge server 115a can request fragments.

Edge server 115a is contacted by viewer device 105a using the URL having the cache key and object identifier embedded as parameters. Edge server 115a can perform a cache lookup in its cache 160 using the cache key and object identifier to see if a dynamic manifest (identified by the cache key) of master manifest data 135 (identified by the object identifier) providing the proper subset of manifest data is stored. If there is a cache miss, indicating that the proper dynamic manifest file is not stored within cache 160, then edge server 115a can contact media server 110, and provide the cache key and object identifier.

Media server 110 can then retrieve or generate dynamic manifest file 145 which is the result of the instructions (as indicated by the cache key) applied to master manifest data 135 (as indicated by the object identifier). For example, media server 110 can retrieve the object (e.g., master manifest data 135) and look up the instructions to apply to it using the cache key since the cache key is a hash based on the instructions. Media server 110 can then generate the dynamic manifest file by applying those instructions to master manifest data 135. Edge server 115a can then receive and provide dynamic manifest file 145 to viewer device 105a as well as cache it in cache 160. Viewer device 105a can then request fragments 150 from edge server 115a using the subset of playback options indicated in dynamic manifest file 145.

Next, viewer device 105b requests to play back the same media content. In FIG. 1, viewer devices 105a and 105b have different attributes. For example, viewer device 105a is a television located in Huntsville, Ala. Viewer device 105b is a smartphone located in Seattle, Wash. Media server 110 can analyze the attributes of viewer device 105b and even though the attributes are different, the attributes might result in the same instructions that lead to the same subset of master manifest data 135. As a result, manifest retrieval data can also be provided to viewer device 105b with the same cache key and object identifier (as well as the same CDN to contact) as manifest retrieval data 140 provided to viewer device 105a.

Viewer device 105b can then contact edge server 115a to receive dynamic manifest file 145. Since dynamic manifest file 145 was previously cached (i.e., placed in cache 160 of edge server 115a), this results in a cache hit (indicating that dynamic manifest file 145 is within cache 160) and it can be quickly retrieved and provided to viewer device 105b without contacting media server 110.

Next, viewer device 105c might contact media server 110 to begin playback of the same media content. However, its attributes might result in instructions that lead to a different subset of master manifest data 135 than what is indicated in dynamic manifest file 145. This would result in a cache miss, and therefore, dynamic manifest file 155 can be provided by media server 110 to edge server 115a and then to viewer device 105c as well as stored in cache 160.

By taking advantage of the fact that a large and diverse data set (e.g., representing device attributes) resolves to a relatively few number of options (e.g., variations of dynamic manifests based on the instructions), caching of dynamic manifest objects is enabled.

Figure 2:
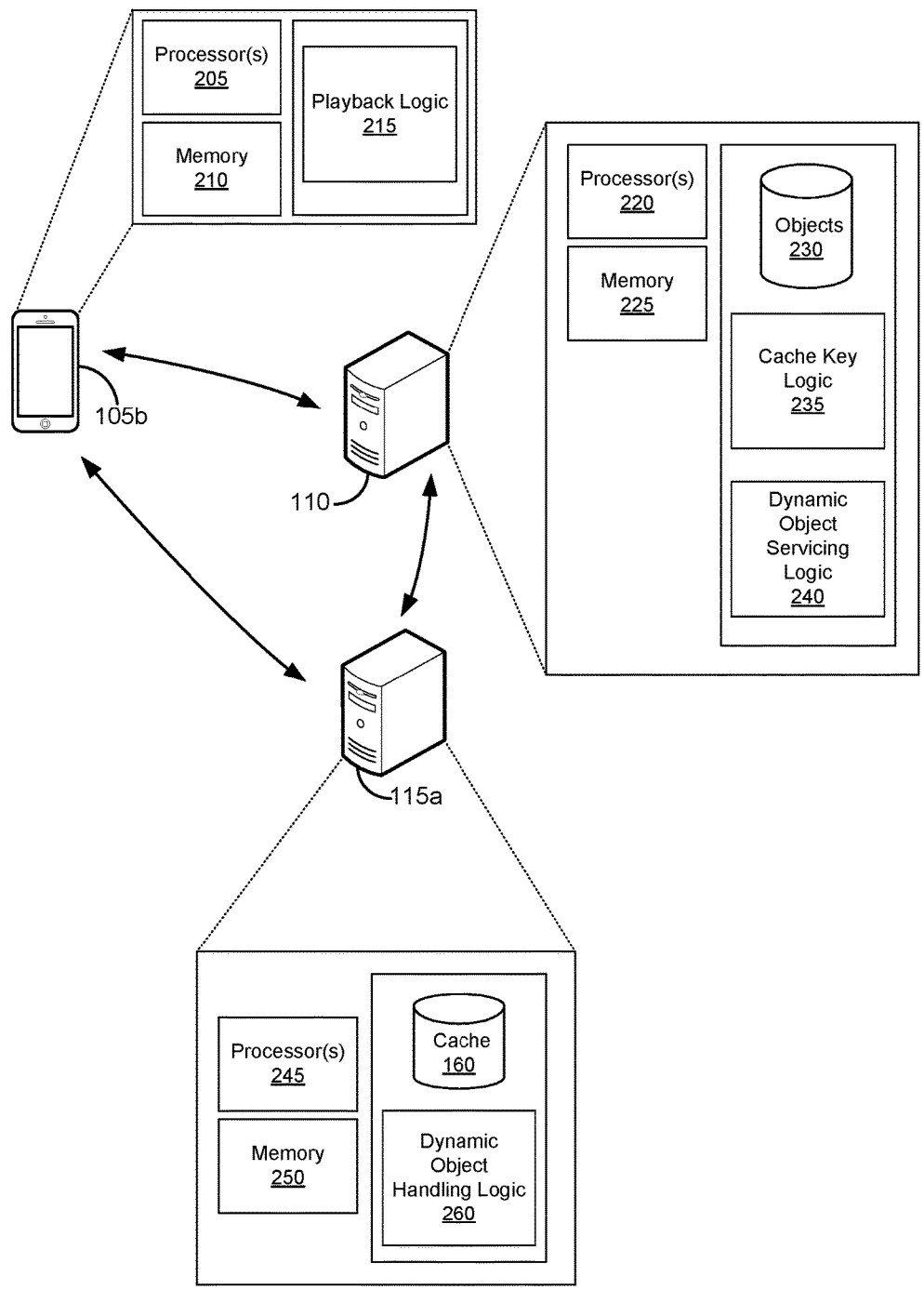
FIG. 2 illustrates an example of a computing environment in which dynamic objects can be cached and used for media content playback.

FIG. 2 illustrates an example of a computing environment in which dynamic manifests can be used for media content playback. The computing environment of FIG. 2 includes media server 110 which can be used to provide a cache key and object identifier to viewer device 105b so that it can request a dynamic manifest file from edge server 115a. Viewer devices can include smartphones, televisions, laptop computers, desktop computers, set-top boxes, video game consoles, tablets, wearable devices, virtual reality headsets, etc.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 110 and edge server 115a may be part of a content delivery system that conforms to any of a wide variety of architectures. The functionality and components of media server 110 and edge server 115a can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on a viewer device), integrated into a separate app from another entity, implemented in an edge server or content server of a CDN, a server of an ISP, etc.

In FIG. 2, viewer device 105 includes various types of logic used to implement a video player to provide playback of media content. Viewer device 105 can include one or more processors 205, memory 210, a display, and other hardware components to provide playback logic 215 to request dynamic manifest files and fragments of media content. For example, processors 205 can execute stored instructions in memory 210 to implement the techniques disclosed herein.

Media server 110 includes one or more processors 220, memory 225, and other hardware components to provide data to viewer device 105a so that it can request a dynamic manifest file from edge server 115a. For example, static objects such as master manifest data 135 can be stored in objects 230. Cache key logic 235 can generate a cache key based on the attributes of viewer device 105b and the static objects stored in objects 230. Dynamic object servicing logic 240 can provide the cache key and an object identifier (associating that cache key with master manifest data 135) to viewer device 105b. Dynamic object servicing logic 240 can also provide dynamic manifests to edge server 115a. For example, processors 220 can execute stored instructions in memory 225 to implement the techniques disclosed herein.

In some implementations, dynamic object servicing logic 240 uses master manifest data stored by objects 230 to generate dynamic manifest files that can be provided to viewer device 105b for playback of media content. For example, objects 230 can store master manifest data 135 in FIG. 1, which can include a large amount of available playback data including details regarding fragments of the video portion of the playback for media content, details regarding fragments of the audio portion of the playback for media content, subtitles, and other types of data related to the playback options of media content. Dynamic object servicing logic 240 can generate a dynamic manifest file from master manifest data stored in objects 230 and provide the dynamic manifest file to edge server 115a, as disclosed herein. In some implementations, the data within objects 230 can be dynamic and changing through time and may be provided from a variety of sources.

Edge server 115a includes various types of logic used to implement a cache at an edge server of a CDN. The cache can be used to store recently requested dynamic objects (e.g., dynamic manifest files of media content) and static objects (e.g., fragments of media content) at a location close to viewer device 105b so that it can provide quick and reliable delivery of the objects to viewer device 105b. In FIG. 2, edge server 115a includes one or more processors 245, memory 250, and other hardware components to request dynamic manifest files from media server 110, store the dynamic manifest files in cache 160, and provide the dynamic manifest files to viewer device 105b. For example, processors 245 can execute stored instructions in memory 250 to implement the techniques disclosed herein.

Figure 3A:
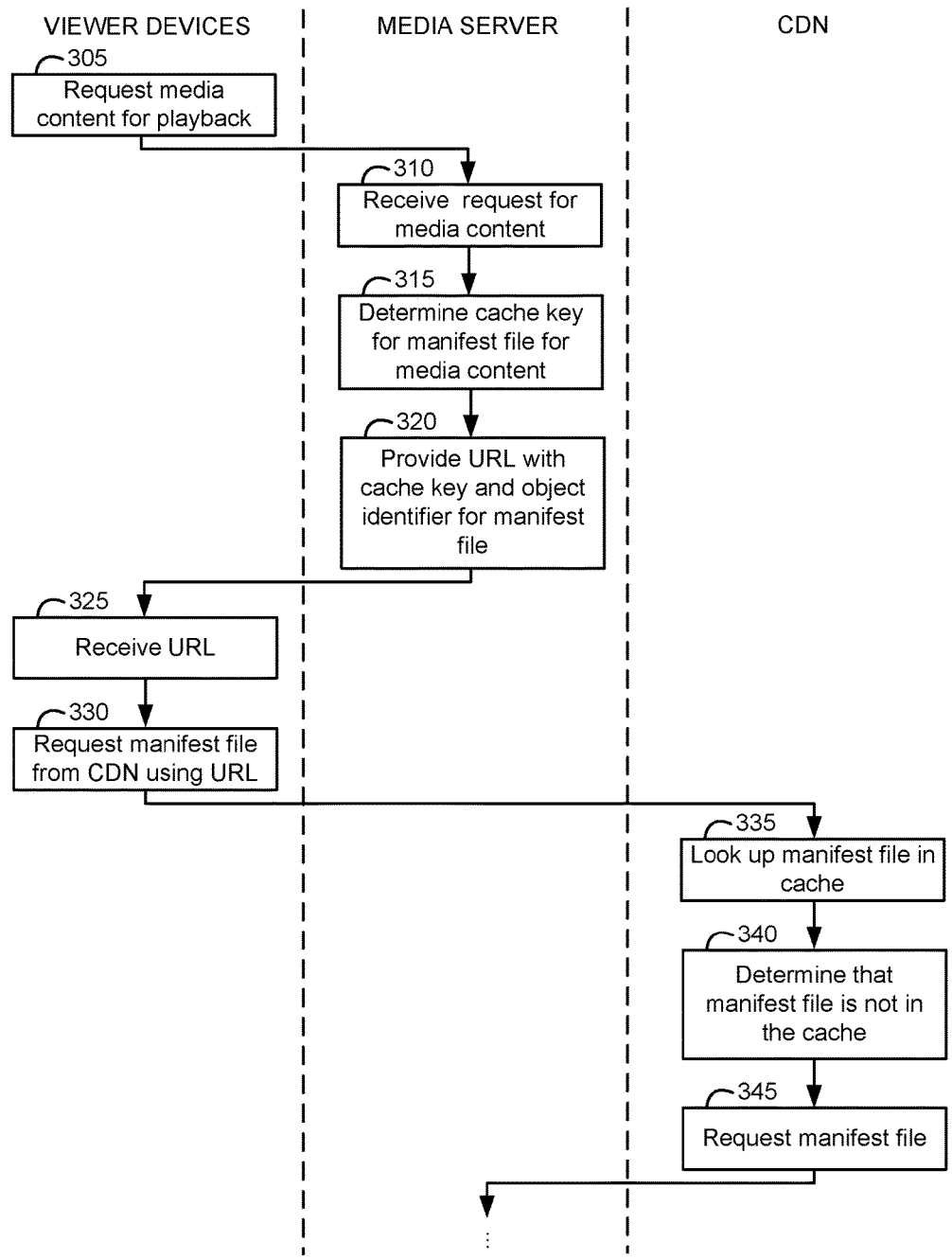
FIGS. 3A, 3B, and 3C are a flowchart illustrating caching a dynamic object for media content playback.
Figure 3B:
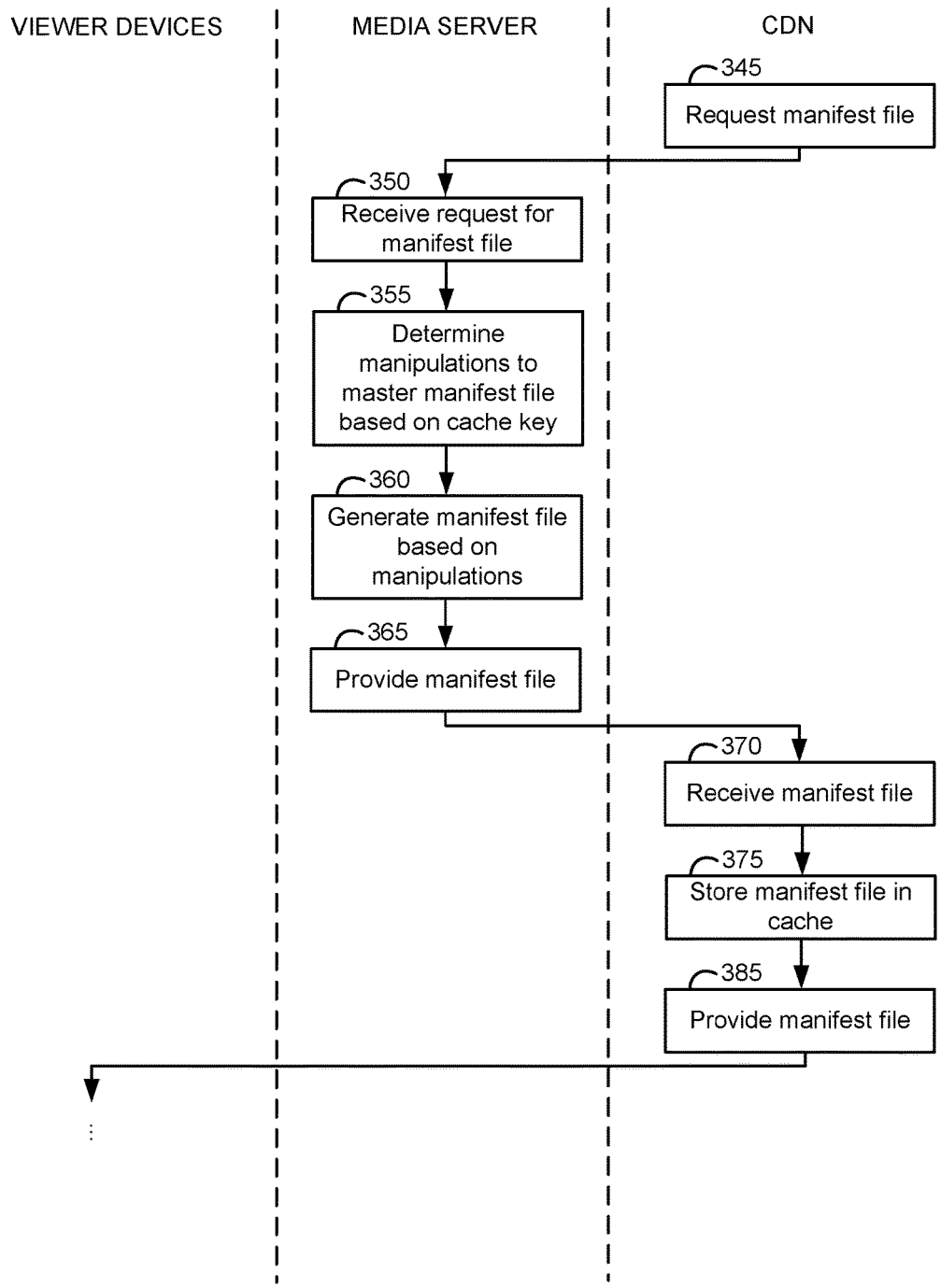
Figure 3C:
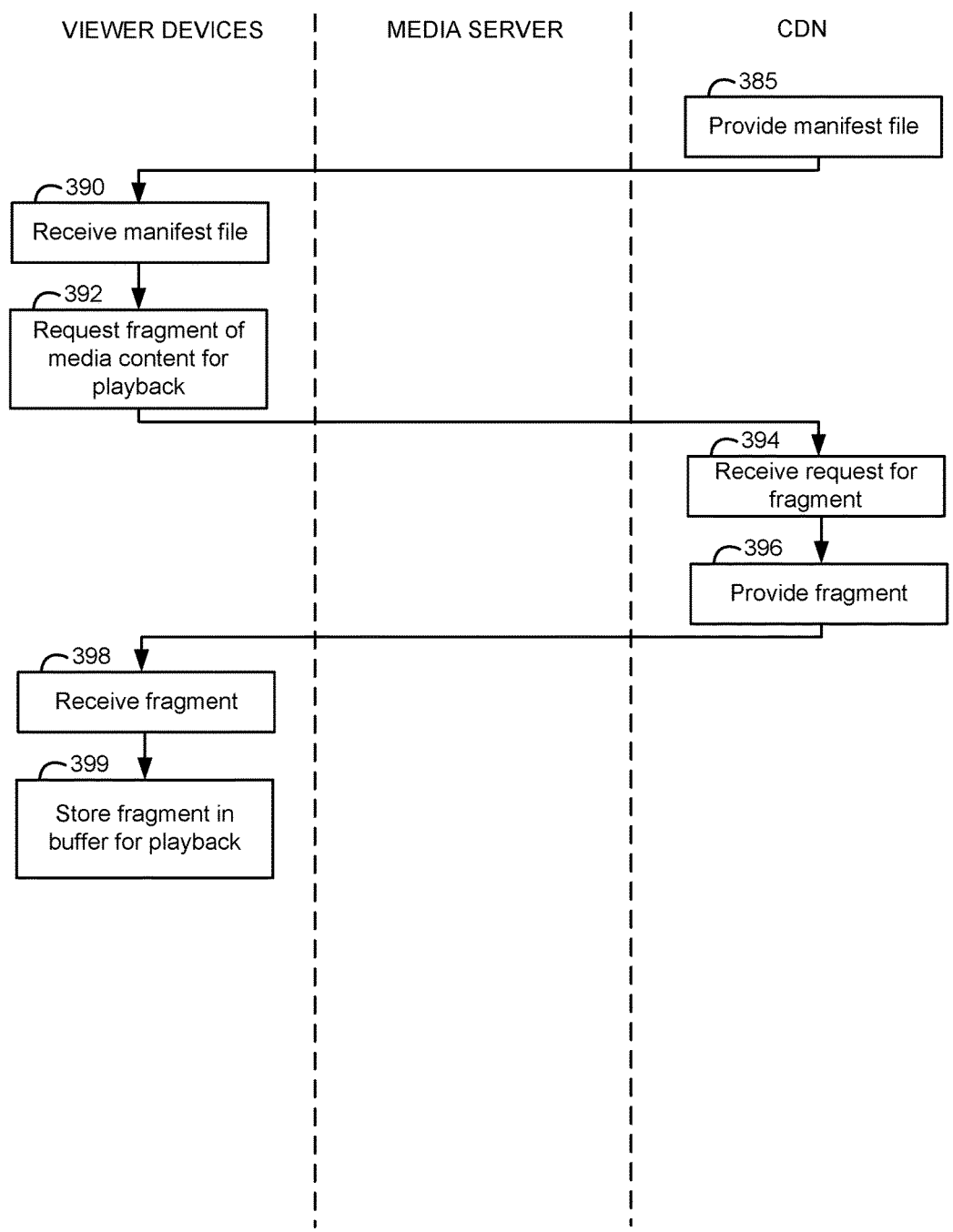

A specific implementation will now be described with reference to FIG. 1, the computing environment of FIG. 2, and the flow diagrams of FIGS. 3A-C, 4A and 4B. In FIG. 3A, a viewer device (e.g., device 105a) can request media content, for example, by selecting an episode of a television show for playback from a video streaming service in a web browser or software program, and therefore, request a particular episode from media server 110 (305). The request can be provided to and received by media server 110 (310). The media server can then determine a cache key for a dynamic manifest file for the requested media content (315).

A cache key can be used to represent a set of instructions that result in a subset of the playback data detailed in master manifest data. For example, media server 110 can determine attributes related to the request for media content. The attributes can include characteristics of the viewer device, including its geographic location, type of device (e.g., smartphone, television, etc.), the time that the request was received, hardware or hardware capabilities of the viewer device, the ISP used by the viewer device, time of the request, playback history, etc. Each attribute can lead to an instruction indicating some manipulation of the available playback data in master manifest data 135. The manipulations can include paring down the available playback data, or even generating new data based on the playback data detailed in master manifest data 135. The overall set of instructions to be applied based on the determined attributes can be hashed together to provide a cache key used to identify the instructions that are applied to master manifest data 135 to produce the end result (i.e., the pared down playback data) of the overall set of instructions. For example, a hash table (or map) data structure can be used in which the hash is the cache key that is linked to the values (or buckets) that represent the instructions. Since relatively few variations of subsets of master manifest data 135 exist (resulting in a few cache keys), many values representing the combinations of instructions can be mapped to unique cache keys representing a final subset of playback data based on those instructions. That is, each unique set of instructions leads to a unique cache key, with each unique cache key representing a unique selection of playback options based on the instructions.

Figure 5A:
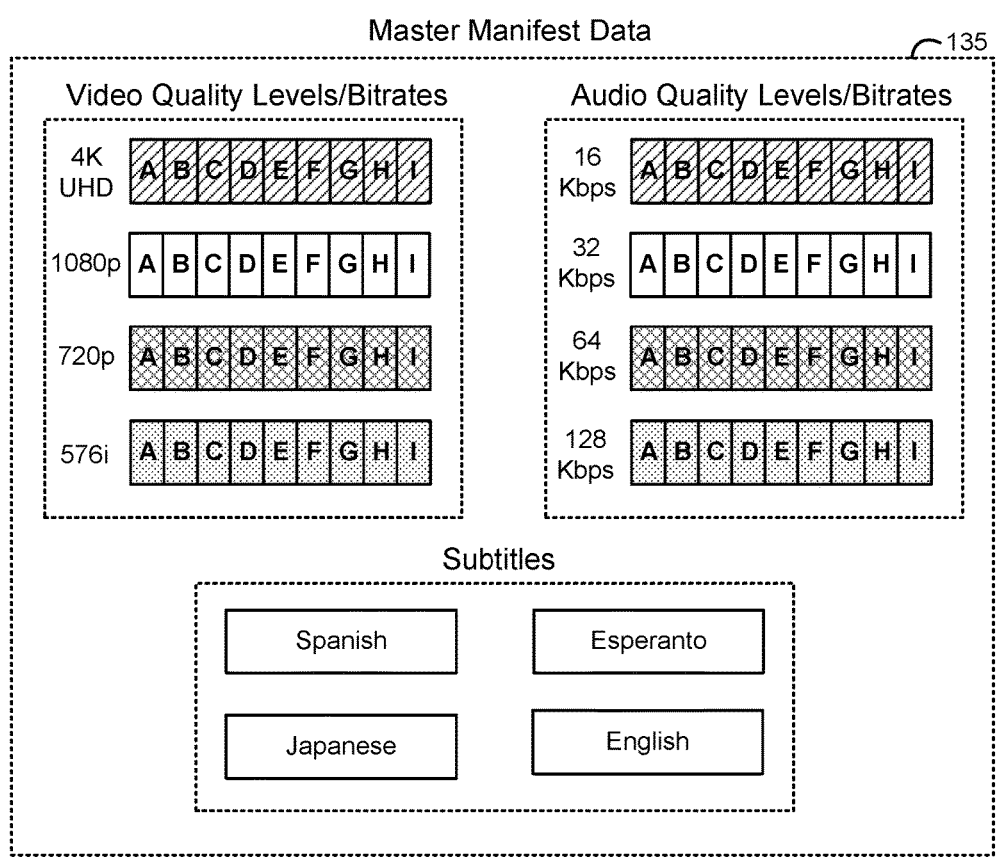
FIGS. 5A, 5B, and 5C illustrate an example of manipulating manifest data to generate dynamic manifest data.
Figure 5B:
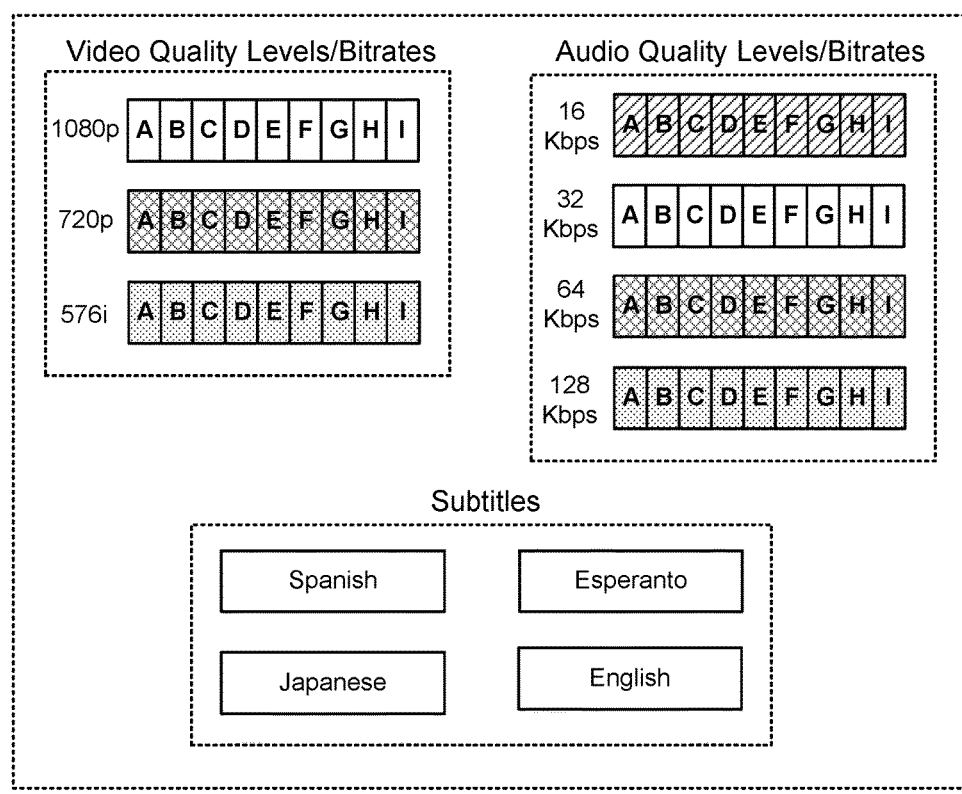
Figure 5C:
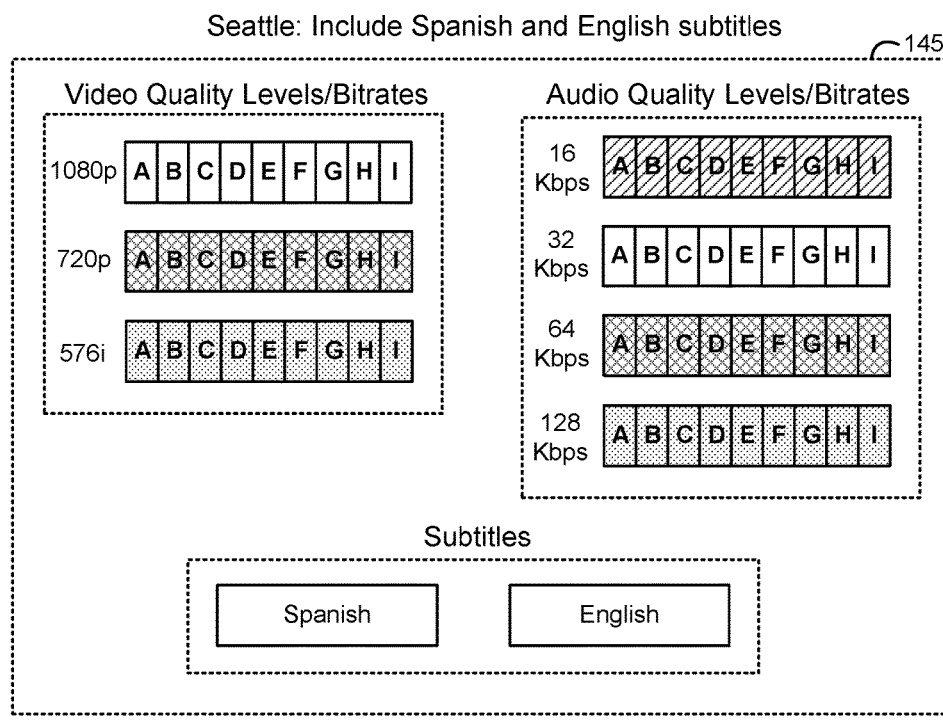

FIGS. 5A, 5B, and 5C illustrate an example of manipulating manifest data to generate dynamic manifest data. FIG. 5A illustrates an example of playback data represented by master manifest data 135. Video quality levels at the 4K UHD, 1080p, 720p, and 576i quality levels are listed as playback options for video quality. Audio quality levels at the 16 kilobytes per second (Kbps), 32 Kbps, 64 Kbps, and 128 Kbps are listed as playback options for audio quality. Spanish, Esperanto, Japanese, and English subtitles are also listed as playback options. As previously discussed, instructions based on the attributes of the request for playback of media content can be used to select a subset of those playback options. For example, a viewer device is a smartphone located in Seattle, Wash. One instruction based off of the viewer device being a smartphone can be executed (e.g., an instruction based on device type), as well as a second instruction based off of the viewer device being located in Seattle, Wash. (e.g., an instruction based on geographic location). These instructions can pare down the available playback options in master manifest data 135 to allow for a dynamic manifest file with fewer playback options. For example, in FIG. 5B, the first instruction indicates that the 4K UHD video quality level should be excluded from a dynamic manifest file since the viewer device is a smartphone. Next, in FIG. 5C, the second instruction indicates that Spanish and English subtitles should be included in the dynamic manifest file since the viewer device is located in Seattle. The playback options depicted in FIG. 5C represent the playback options that should be detailed in a dynamic manifest file for a smartphone in Seattle, Wash. As a result, a cache key can represent instructions for removing the 4K UHD video quality level and including Spanish and English subtitles.

Figure 6:
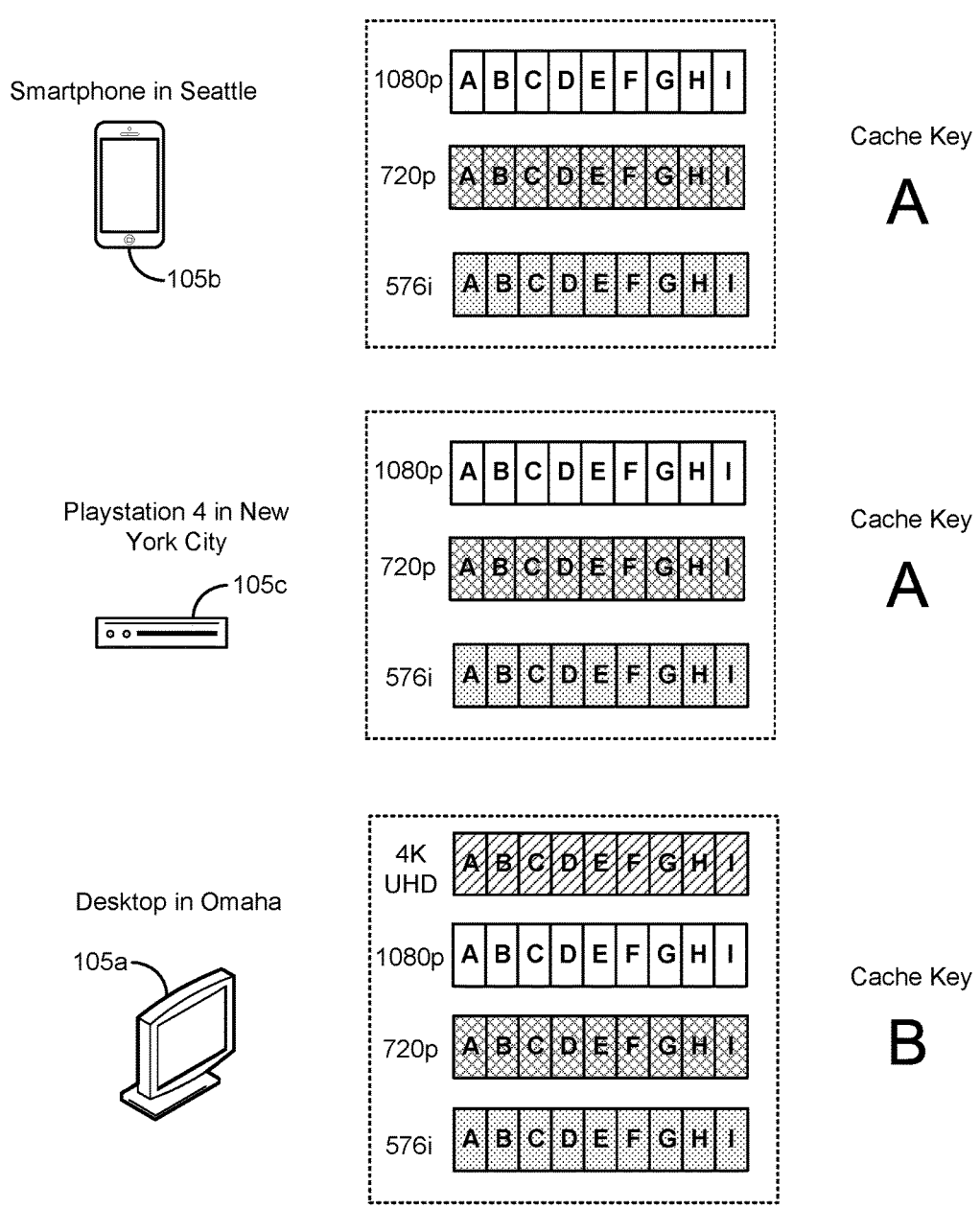
FIG. 6 illustrates an example of cache keys for dynamic manifest data.

Viewer devices with different attributes can have instructions that lead to the same playback options as FIG. 5C. FIG. 6 illustrates an example of cache keys for dynamic manifest data. In FIG. 6, the set of instructions depicted in FIG. 5A-5C that result in playback options for a dynamic manifest file for a smartphone in Seattle are given a cache key of A as a simplified example. In FIG. 6, a Playstation 4 in New York City has different attributes (a video game console as a device type and New York City as its geographical location) but the attributes might result in the same instructions, and therefore the same selection of playback options as a smartphone in New York City. That results in the same cache key of A for viewer device 105*c*. By contrast, viewer device 105*a* in FIG. 6 is a desktop computer in Omaha, Nebr. that has a different set of attributes that result in different instructions selecting a different subset of playback options from master manifest data 135. As a result, a cache key of B can be generated based on a hash of that different set of instructions.

Returning to FIG. 3A, media server 110 can provide data to the viewer device with the cache key and an object identifier for the viewer device to request a dynamic manifest file from an edge server. For example, media server 110 can generate a uniform resource locator (URL) pointing to edge server 115*a* of CDN 125 for the viewer device to contact for a dynamic manifest file. The dynamic manifest file for the viewer device to request can be indicated by the cache key. Additionally, media server 110 can also provide an object identifier identifying master manifest data 135 for the specific media content. In some implementations, the URL pointing to edge server 115*a* can include a query string with parameters indicating the cache key and object identifier.

The viewer device receives the URL (325) and can then request the dynamic manifest file from edge server 115*a* of CDN 125 using the URL (330). Since the URL includes the cache key and object identifier, those can also be provided to the edge server. The edge server can look up whether it has the dynamic manifest file in its cache (335), for example, by using the cache key and object identifier as identifiers for objects in its cache. If the dynamic manifest file is not in its cache (340) then the edge server can request the dynamic manifest file from media server 110 (345). That is, edge server 115*a* can request for the dynamic manifest file from media server 110 if there is a cache miss indicating that the dynamic manifest file is not stored in its cache.

Edge server 115*a* can provide the cache key and object identifier to media server 110. Media server 110 receives the request (350). Since media server 110 is provided the cache key representing the series of instructions and also the object identifier representing master manifest data 135, this allows for media server 110 to determine the instructions used to manipulate master manifest data 135 to generate the dynamic manifest file (355). For example, using the hash data structure that associates cache keys with the instructions, and since media server 110 is provided the cache key, it can look up the instructions since they correspond to the cache key. Additionally, since media server 110 is also provided the object identifier, it can identify that the instructions are to be applied to master manifest data 135. As a result, media server 110 can retrieve master manifest data 135 and apply the instructions to generate the dynamic manifest file detailing the reduced amount of playback options (360). Media server 110 can then provide the dynamic manifest file to edge server 115*a* (365).

Edge server 115*a* can receive the dynamic manifest file (370) and store the dynamic manifest file in its cache (375). In some implementations, the dynamic manifest file can be stored in association with the cache key and object identifier so that they can be used to determine whether the dynamic manifest file is stored within the cache in the future. The dynamic manifest file can also be provided to the viewer device (385). The viewer device receives the dynamic manifest file (390) and can select a fragment of the media content for playback (392). The requested fragment can be one of the playback options detailed in the dynamic manifest file, which is a subset of master manifest data 135. Edge server 115*a* can receive the request for the fragment (394) and provide that fragment to the viewer device (396). The viewer device can receive the fragment (398) and store it in a buffer for playback (399).

Figure 4A:
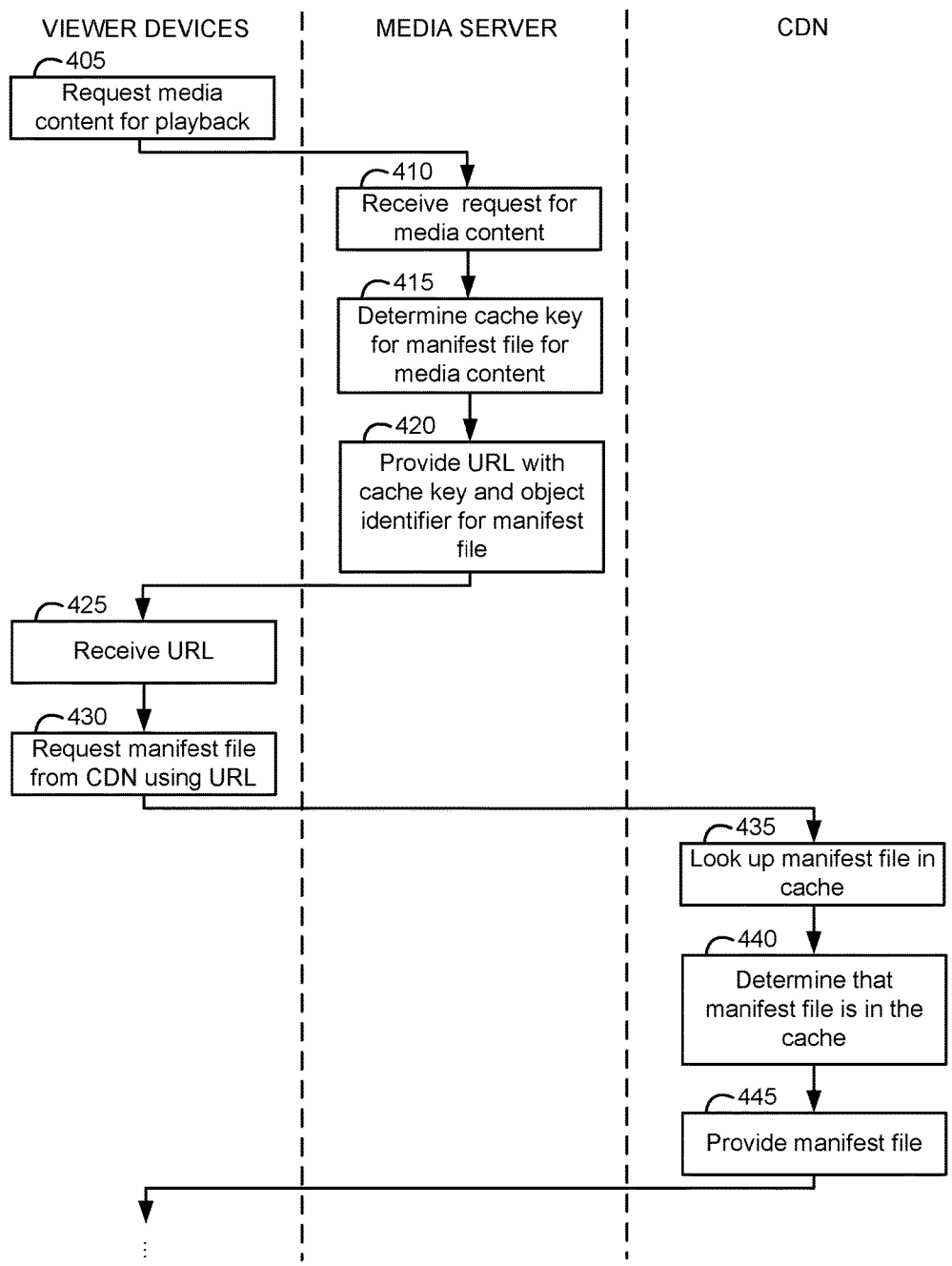
FIGS. 4A and 4B are a flowchart illustrating using a cache to provide a dynamic object for media content playback.
Figure 4B:
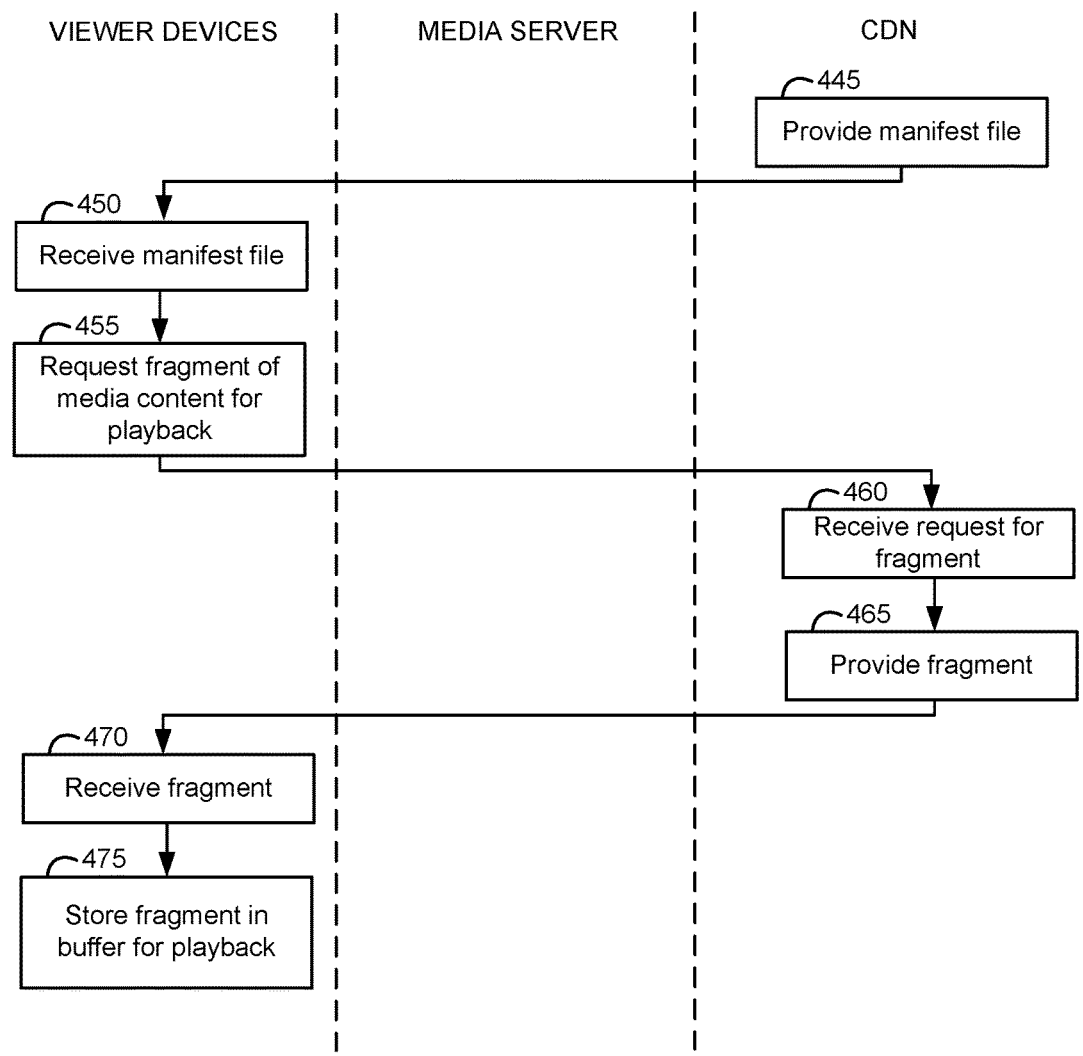

Next, a second viewer device can request the same media content for playback. FIGS. 4A and 4B are a flowchart illustrating using a cache to provide a dynamic object for media content playback.

In FIG. 4A, the second viewer device can request the same media content for playback (405). Media server 110 receives the request (410) and determines a cache key for a dynamic manifest file for the media content (415). If the attributes of the second viewer device result in a similar set of instructions as the prior viewer device in the example of FIGS. 3A-C, then the same cache key can be determined. Media server 110 can then provide the same URL with the same cache key and object identifier as provided to the prior viewer device (420).

The viewer device then receives the URL (425) and requests the dynamic manifest file (430). The edge server can then look up whether it has the dynamic manifest file in its cache using the cache key and object identifier (435). If the dynamic manifest file is stored in the cache, then this results in a cache hit. Using the cache key and object identifier, edge server 115a can determine that a dynamic manifest file associated with those is already stored in its cache (440). As a result, edge server 115a can provide the dynamic manifest file to the second viewer device (445).

The second viewer device can then receive the manifest file (450), and request a fragment of the media content for playback (455). The edge server receives the request for the fragment (460) and provides it (465). The viewer device receives the fragment (470) and stores it in a buffer for playback (475).

Figure 7:
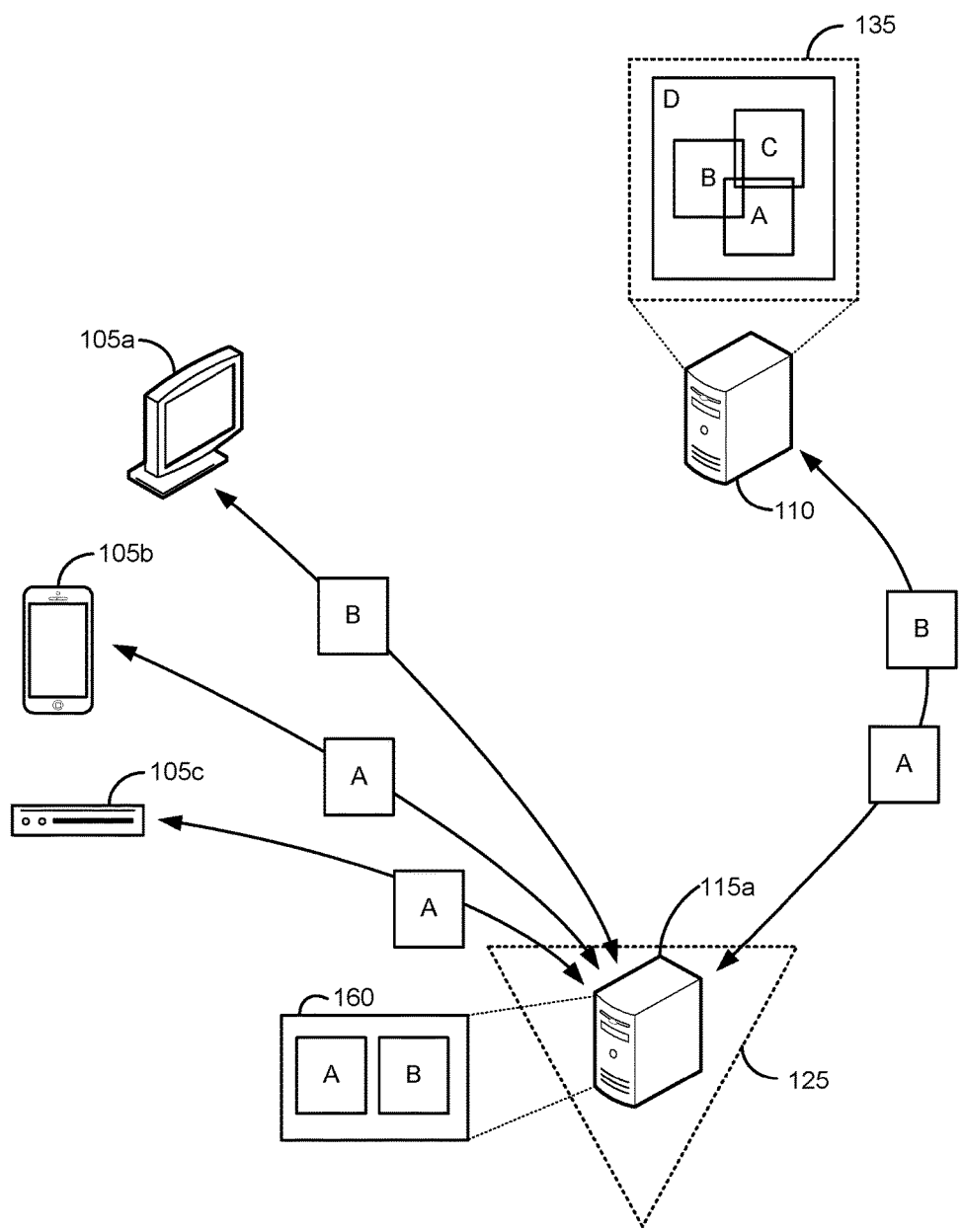
FIG. 7 illustrates an example of providing dynamic manifest data using cache keys.

FIG. 7 illustrates another example of providing dynamic manifest data using cache keys. In FIG. 7, viewer device 105a requests a dynamic manifest file for media content. Media server 110 stores master manifest data 135, which includes playback options D (e.g., all of the playback options), A, B, and C. Playback options A-C are smaller selections of playback options D.

Based on the attributes of viewer device 105a, it can request a dynamic manifest file from edge server 115a that corresponds to a cache key of B. Edge server 115a can contact media server 110, provide it with the cache key B and object identifier identifying master manifest data 135. Media server 110 can then look up the instructions for cache key B and perform them upon playback options D of master manifest data 135 to produce a dynamic manifest file with playback options B. This can be provided to edge server 115a, cached, and provided to viewer device 105a.

Next, viewer device 105b requests the same media content for playback. Viewer device 105b in FIG. 7 might have different attributes that lead to a different set of instructions to select different playback options to be included in a dynamic manifest file than for viewer device 105a. As a result, it is provided a dynamic manifest file with a cache key of A and the same dynamic manifest file is also stored within cache 160 of edge server 115a. Viewer device 105c can then request the same dynamic manifest file from edge server 115a. Since the dynamic manifest file providing playback options A is already in cache 160, it can be provided without contacting media server 110.

Many of the examples described herein involve television shows as media content. Media content can also include movies, video clips, music videos, music, podcasts, electronic books, and other types of content.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computing device, comprising:
one or more processors and memory configured to:
receive a first request for playback of media content from a first viewer device;
determine master manifest data corresponding to the media content, the master manifest data having been generated prior to receiving the first request, and the master manifest data having an associated master manifest data identifier;
determine attributes of the first viewer device;
determine a first cache key based on the attributes of the first viewer device;
determine a first edge server identifier for a first edge server of a content delivery network (CDN);
provide a first Uniform Resource Locator (URL) including the first edge server identifier, the first cache key and the master manifest data identifier to the first viewer device for generating a first request for a first dynamic manifest file to the first edge server, the first dynamic manifest file including a first subset of playback options identified in the master manifest data;
receive a request for generating the first dynamic manifest file from the first edge server, the request for generating the first dynamic manifest file from the first edge server including the first cache key and the master manifest data identifier;
generate the first dynamic manifest file using a first set of instructions corresponding to the first cache key and the master manifest data identified by the master manifest identifier; and
provide the first dynamic manifest file to the first edge server for both storing in a cache at the first edge server and for providing to the first viewer device in response to the first request for the first dynamic manifest file.

2. The computing device of claim 1, the processor and memory further configured to:
receive a second request for playback of the media content from a second viewer device;
determine attributes of the second viewer device;
determine that the first cache key corresponds to the attributes of the second viewer device; and
provide the first URL to the second viewer device for generating a second request for the first dynamic manifest file to the first edge server.

3. The computing device of claim 2, wherein the first cache key is generated using a hash of the attributes of the first viewer device.

4. The computing device of claim 1, the processor and memory further configured to:
  receive a second request for playback of media content from a second viewer device;
  determine attributes of the second viewer device;
  determine a second cache key based on the attributes of the second viewer device;
  provide a second Uniform Resource Locator (URL) including the first edge server identifier, the second cache key and the master manifest data identifier to the second device for generating a second request for a second dynamic manifest file to the first edge server, the second dynamic manifest file including a second subset of the playback options identified in the master manifest data;
  receive a request for generating the second dynamic manifest file from the first edge server, the request for generating the second dynamic manifest file from the first edge server including the second cache key and the master manifest data identifier;
  generate the second dynamic manifest file using a second set of instructions corresponding to the second cache key and the master manifest data identified by the master manifest identifier; and
  provide the second dynamic manifest file to the first edge server for both storing in a cache at the first edge server and for providing to the second viewer device in response to the second request for the second dynamic manifest file.

5. The computing device of claim 4, wherein the second subset of the playback options is different than the first subset of the playback options.

6. The computing device of claim 4, wherein the playback options include quality levels of fragments of video content of the media content, and the first subset and the second subset include different selections of quality levels.

7. A method, comprising:
  receiving a first request for playback of media content from a first viewer device;
  determining master manifest data corresponding to the media content, the master manifest data having been generated prior to receiving the first request, and the master manifest data having an associated master manifest data identifier;
  determining attributes of the first viewer device;
  determining a first cache key based on the attributes of the first viewer device;
  determining a first edge server identifier for a first edge server of a content delivery network (CDN);
  providing a first Uniform Resource Locator (URL) including the first edge server identifier, the first cache key and the master manifest data identifier to the first viewer device for generating a first request for a first dynamic manifest file to the first edge server, the first dynamic manifest file including a first subset of playback options identified in the master manifest data;
  receiving a request for generating the first dynamic manifest file from the first edge server, the request for generating the first dynamic manifest file from the first edge server including the first cache key and the master manifest data identifier;
  generating the first dynamic manifest file using a first set of instructions corresponding to the first cache key and the master manifest data identified by the master manifest identifier; and
  providing the first dynamic manifest file to the first edge server for both storing in a cache at the first edge server and for providing to the first viewer device in response to the first request for the first dynamic manifest file.

8. The method of claim 7, further comprising:
  receiving a second request for playback of the media content from a second viewer device;
  determining attributes of the second viewer device, the attributes of the second viewer device being different than the attributes of the first viewer device;
  determining that the first cache key corresponds to the attributes of the second viewer device; and
  providing the first URL to the second viewer device for generating a second request for the first dynamic manifest file to the first edge server.

9. The method of claim 8, wherein the first cache key is generated using a hash of the attributes of the first viewer device.

10. The method of claim 7, further comprising:
  receiving a second request for playback of media content from a second viewer device;
  determining attributes of the second viewer device;
  determining a second cache key based on the attributes of the second viewer device;
  providing a second Uniform Resource Locator (URL) including the first edge server identifier, the second cache key and the master manifest data identifier to the second device for generating a second request for a second dynamic manifest file to the first edge server, the second dynamic manifest file including a second subset of the playback options identified in the master manifest data;
  receiving a request for generating the second dynamic manifest file from the first edge server, the request for generating the second dynamic manifest file from the first edge server including the second cache key and the master manifest data identifier;
  generating the second dynamic manifest file using a second set of instructions identified by the second cache key and the master manifest data identified by the master manifest identifier; and
  providing the second dynamic manifest file to the first edge server for both storing in a cache at the first edge server and for providing to the second viewer device in response to the second request for the second dynamic manifest file.

11. The method of claim 10, wherein the second subset of the playback options is different than the first subset of playback options.

12. The method of claim 10, wherein the playback options include quality levels of fragments of video content of the media content, and the first subset and the second subset include different selections of quality levels.

13. An edge server, comprising:
  one or more processors and memory configured to:
  receive from a first viewer device a first request for a first dynamic manifest file, the first dynamic manifest file indicating first playback quality options of media content, the first playback quality options corresponding to attributes of the first viewer device, the first request corresponding to a first Uniform Resource Locator (URL), the first URL including a first edge server identifier corresponding to the edge server, a first cache key, and a master manifest data identifier;
  determine using the first cache key that the first dynamic manifest file is not in a cache at the edge server;
  provide to a media server the first cache key and the master manifest identifier, the first cache key corresponding to a first set of instructions, the first set of instructions corresponding to the attributes of the first viewer device, and the master manifest data identifier corresponding to a source of the first playback quality options, the first set of instructions indicating manipulations to the source of the first playback quality options to generate the first dynamic manifest file;

receive the first dynamic manifest file from the media server, the first dynamic manifest file representing the first playback quality options;

store the first dynamic manifest file in the cache at the edge server; and provide the first dynamic manifest file to the first viewer device.

14. The edge server of claim 13, the one or more processors and memory further configured to:

receive a second request for the first dynamic manifest file from a second viewer device;

determine that the first dynamic manifest file is in the cache at the edge server; and provide the first dynamic manifest file in the cache at the edge server to the second viewer device.

15. The edge server of claim 13, the one or more processors and memory further configured to:

receive from a second viewer device a second request for a second dynamic manifest file, the second dynamic manifest file indicating second playback quality options of the media content, the second request corresponding to a second URL, the second URL including the first edge server identifier corresponding to the edge server, a second cache key, and the master manifest data identifier;

determine using the second cache key that the second dynamic manifest file is not in a cache at the edge server;

provide the second cache key and the master manifest identifier to the media server, the second cache key corresponding to a second set of instructions, the second set of instructions being based on attributes of the second viewer device, the master manifest data identifier corresponding to a source of the second playback quality options, the second set of instructions indicating manipulations to the source of the second playback quality options to generate the second dynamic manifest file;

receive the second dynamic manifest file from the media server, the second dynamic manifest file representing the second playback quality options;

store the second dynamic manifest file in the cache; and provide the second dynamic manifest file to the second viewer device.

16. The edge server of claim 15, wherein the first playback quality options and the second playback quality options are different.

17. A method of operating an edge server, comprising:

receiving from a first viewer device a first request for a first dynamic manifest file, the first dynamic manifest file indicating first playback quality options of media content, the first playback quality options corresponding to attributes of the first viewer device, the first request corresponding to a first Uniform Resource Locator (URL), the first URL including a first edge server identifier corresponding to the edge server, a first cache key, and a master manifest data identifier;

determining using the first cache key that the first dynamic manifest file is not in a cache at the edge server;

providing to a media server the first cache key and the master manifest identifier, the first cache key corresponding to a first set of instructions, the first set of instructions corresponding to the attributes of the first viewer device, and the master manifest data identifier corresponding to a source of the first playback quality options, the first set of instructions indicating manipulations to the source of the first playback quality options to generate the first dynamic manifest file;

receiving the first dynamic manifest file from the media server, the first dynamic manifest file representing the first playback quality options;

storing the first dynamic manifest file in the cache at the edge server; and providing the first dynamic manifest file to the first viewer device.

18. The method of operating an edge server of claim 17, further comprising:

receiving a second request for the first dynamic manifest file from a second viewer device;

determining that the first dynamic manifest file is in the cache at the edge server; and providing the first dynamic manifest file in the cache at the edge server to the second viewer device.

19. The method of operating an edge server of claim 17, further comprising:

receiving from a second viewer device a second request for a second dynamic manifest file, the second dynamic manifest file indicating second playback quality options of the media content, the second request corresponding to a second URL, the second URL including the first edge server identifier corresponding to the edge server, a second cache key, and the master manifest data identifier;

determining using the second cache key that the second dynamic manifest file is not in a cache at the edge server;

providing the second cache key and the master manifest identifier to the media server, the second cache key corresponding to a second set of instructions, the second set of instructions being based on attributes of the second viewer device, the master manifest data identifier corresponding to a source of the second playback quality options, the second set of instructions indicating manipulations to the source of the second playback quality options to generate the second dynamic manifest file;

receiving the second dynamic manifest file from the media server, the second dynamic manifest file representing the second playback quality options;

storing the second dynamic manifest file in the cache; and providing the second dynamic manifest file to the second viewer device.

20. The method of operating an edge server of claim 19, wherein the first playback quality options and the second playback quality options are different.

* * * * *